Nov. 6, 1928.

F. R. ZUMBRO ET AL 1,690,187

AUTOMATIC STARTER

Filed May 18, 1926   2 Sheets-Sheet 1

Inventors
Frank R. Zumbro
Francis Shenton

By

Attorney

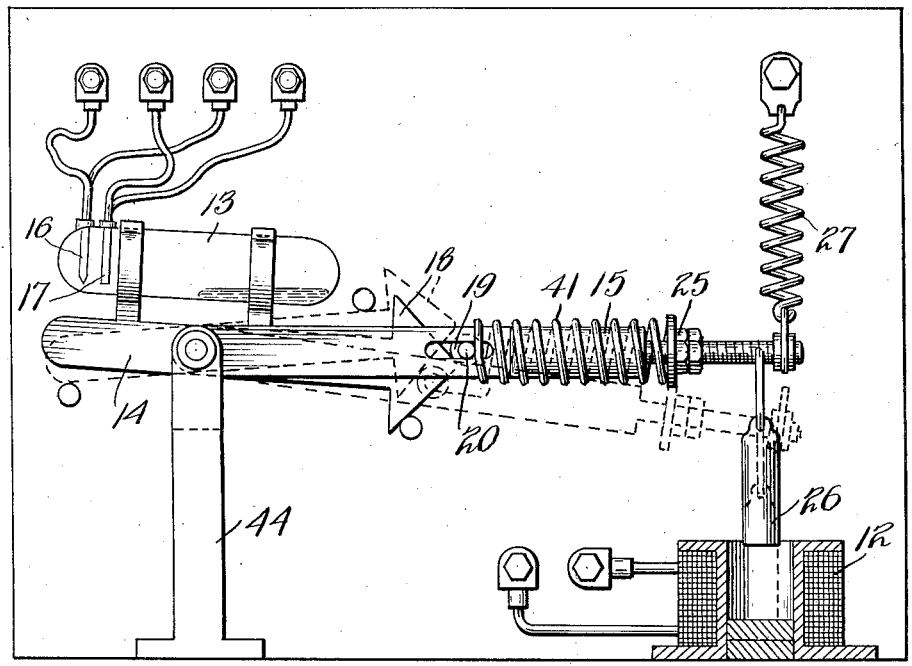
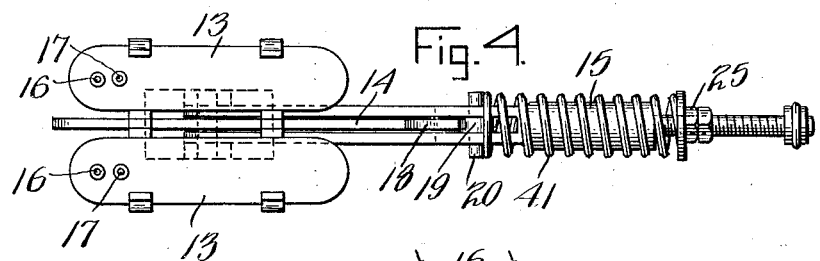
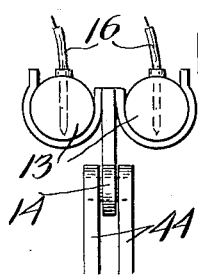

Patented Nov. 6, 1928.

1,690,187

UNITED STATES PATENT OFFICE.

FRANK R. ZUMBRO AND FRANCIS SHENTON, OF WAYNESBORO, PENNSYLVANIA, ASSIGNORS TO FRICK COMPANY, OF WAYNESBORO, PENNSYLVANIA, A CORPORATION OF PENNSYLVANIA.

AUTOMATIC STARTER.

Application filed May 18, 1926. Serial No. 109,941.

Our said invention relates to an automatic starter for single-phase split-phase induction motors adapted to be used in conjunction with refrigerating machines or the like and especially with reference to an arrangement whereby the motor may be sealed in a compartment of any kind, and the switching arrangements necessary to the operation of the motor be all made external to the compartment. It applies, especially to motors driving a load requiring a very small starting torque, such as rotary compressors or blowers, and which handle a gas likely to explode from a spark were the switching operations to take place within the compartment.

An object of the invention is to provide a starter in which, when circuits are completed upon the operation of a thermostat or pressure device the motor is started by the use of a starting winding and after starting the starting winding will automatically be open-circuited and the motor will continue to operate from the running winding only.

Figure 1:
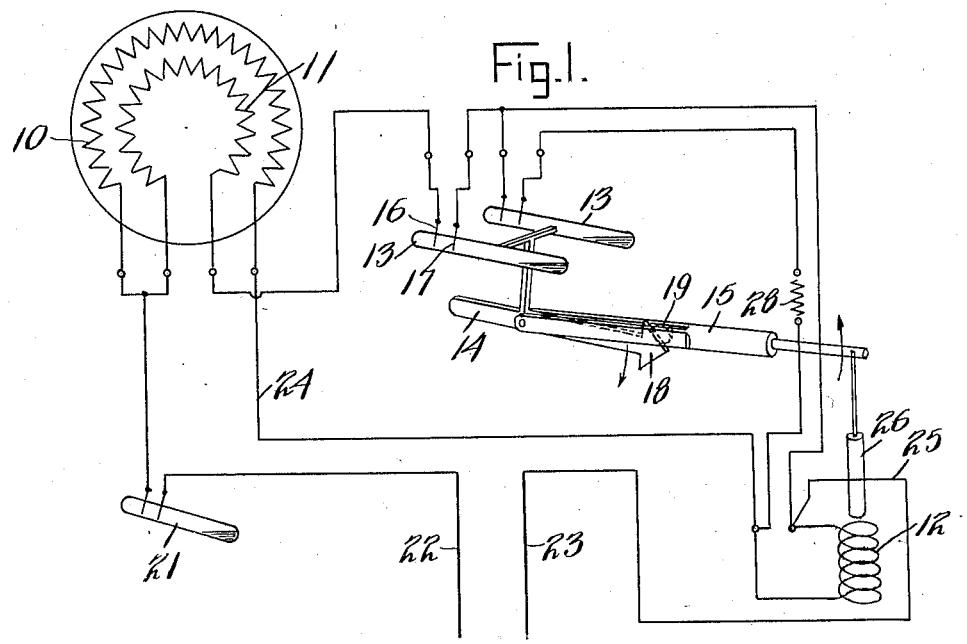
Figure 2:
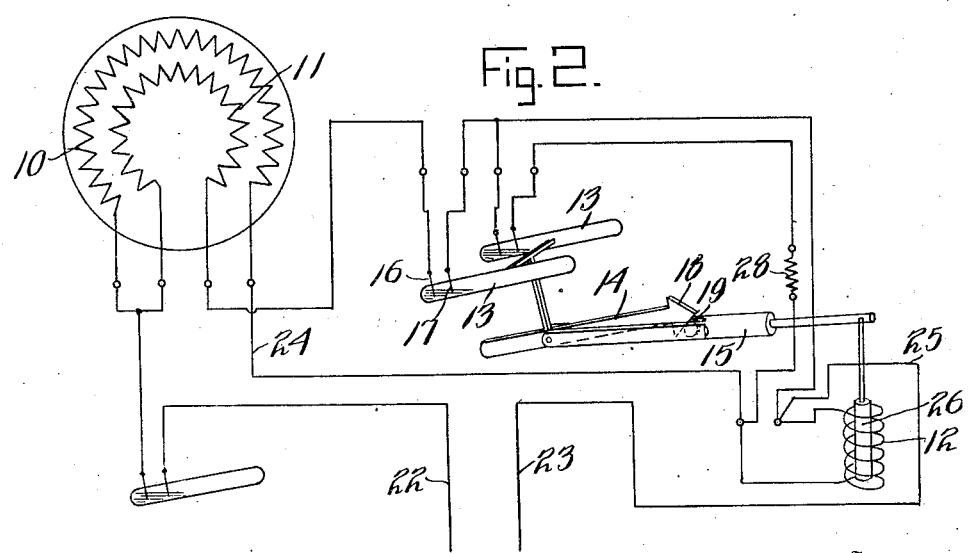

Referring to the accompanying drawings which are made a part hereof and on which similar reference characters indicate similar parts, Figure 1 is a wiring diagram with the switch in its normal position when the motor is in a position other than starting, Figure 2, a wiring diagram showing the switch in position for starting, Figure 3, a side elevation of our switch, Figure 4, a top plan view of the same figure, and Figure 5, a fragmentary rear end elevation of the mercury tubes.

In the drawings reference character 10 indicates the running winding of a single-phase split-phase motor which is also provided with a starting winding 11. The starting winding 11 is used in conjunction with the running winding 10 to provide a revolving field in the stator of the motor when a circuit is closed through both windings and after the motor has been given an initial start the starting winding is open-circuited and the motor continues to operate on the running winding only.

A solenoid 12 is provided for controlling a pair of switches 13 mounted on a rocker arm 14 which are operated in conjunction with an arm 15 connected to the core of said solenoid. The tubes 13 having one pole, the front pole as shown in Figure 1, in series circuit with the starting winding and the other pole, the rear one as shown in the same figure in parallel or shunt circuit to the solenoid winding 12 and are preferably tubular mercury switches having contacts 16 and 17 extending into one end of the tube adapted to be bridged by the mercury when the tube is tilted to cause the mercury to flow to the end of the tube in which the contacts are located. The rocker arm 14 which supports the mercury tubes is pivotally mounted on a base 44 to which is also pivoted at the same point the bifurcated end of the arm 15. The rocker arm 14 is mounted between the bifurcated arms and is provided with an arrow head or double-faced cam 18 and said arms are provided with opposed slots 19 in which are journaled the extremities of a roller 20. A coiled spring 41 is disposed around the forward end of the bar 15 and engages a roller 20 while the opposite end of the spring is adjustably held against longitudinal movement by lock-nuts 25. This construction causes the roller 20 to bear upon either the upper or the lower face of the cam 18 to maintain the mercury tubes tilted in one direction to complete in the other direction to break the circuit.

In operation when the bar 15 is moved downwardly by means of the solenoid attracting its core the roller will ride over the apex of the cam 18 and throw the rocker arm 14 upward with a snap action. In order to maintain the parts in the position shown in Figure 3 when the electromagnet is not energized I provide a spring 27 which will normally hold the parts as shown and will permit the core of the electromagnet to be attracted but will return the parts to the position shown as soon as said core is released. Power leads 22 and 23 are provided and a thermostatically controlled switch 21 is located in the circuit between the power lead 22 and the windings of the motor. Inductive resistance unit 28 is also applied in the line from the second of the pair of mercury switches and is in the circuit bridging the solenoid winding.

As soon as the thermostatically controlled switch 21 is shifted to "on" position, as shown in Figure 2, current will flow from lead 22 through the running winding of the motor, through line 24 to solenoid 12 through line 25 to the power line 23. The current drawn by the running winding under this condition is large and in passing through the coil of the electromagnet 12 a strong magnetic field is set up which attracts the core 26 of the solenoid and pulls the same and the bar 15 downwardly against the action of the spring 27 to the position shown in dotted lines in Figure 3. At the same time the roller passes over the apex of the head of the rocker arm 14 upon which the mercury tube switches are supported and said rocker arm snaps up to the position shown in dotted lines and the mercury in the tube flows to the left and closes the circuit between the contacts 16 and 17. At the instant this operation occurs the front tube closes the circuit through the split-phase starting winding 11 which enables the motor to start and practically at the same time the rear tube short circuits the current from the coil of the solenoid 12 which action materially reduces or practically eliminates the magnetic field set up in the solenoid by means of which the core has been attracted and the attraction is insufficient to withstand the tension of the spring 27 whereupon the members 14 and 15 snap back into their original position, as shown in Figures 1 and 3. The resistance unit 28 is connected into the short-circuiting circuit of the solenoid for the purpose of slowing up the action so that the switches may be in circuit a sufficient length of time to insure the starting of the motor. When the parts have assumed the position shown in Figures 1 and 3 the circuit through the mercury switches is interrupted and the circuit is then through the running winding 10 with the starting winding entirely cut out and the motor operating through the running winding.

It will be obvious to those skilled in the art that various changes may be made in our device without departing from the spirit of the invention and therefore we do not limit ourselves to what is shown in the drawings and described in the specification but only as indicated in the appended claims.

Having thus fully described our said invention, what we claim as new and desire to secure by Letters Patent is:

1. The combination of a motor having a pair of windings, means for controlling the operation of said motor, a switch in circuit with each of said motor windings, a solenoid in circuit with one winding of the motor arranged upon the operation of the first mentioned means to close said switches, one of said switches serving to short circuit the solenoid whereby the same will release the said switches after a time delay and open circuit one winding to permit the motor to operate on the other winding, substantially as set forth.

2. The combination of a motor having a pair of windings, means for controlling the motor circuit, a solenoid in circuit with one of said windings, a switch in circuit with each of said windings operable by the solenoid when the initial impulse current is drawn by the motor, means for biasing said switches to initial position when released by said solenoid, and means for short circuiting the solenoid to cause it to release said switches, substantially as set forth.

3. The combination of a motor having a pair of windings, means for controlling the motor circuit, a solenoid in circuit with one of said windings, a switch in circuit with each of said windings operable by the solenoid when the initial impulse current is drawn by the motor, means for biasing said switches to initial position when released by said solenoid, means for short circuiting the solenoid to cause it to release said switches, and means for retarding the releasing action of said solenoid, substantially as set forth.

4. The combination of a motor having a pair of windings, a temperature controlled switch for controlling the operation of said motor, a mercury tube switch in circuit with each of said windings, a solenoid in circuit with one winding of the motor whereby the closure of the temperature controlled switch will operate said mercury switches, one of said mercury switches being adapted to short circuit the solenoid whereby said mercury switches may return to initial position and open one circuit causing the motor to operate on only one of its windings, substantially as set forth.

5. The combination of a motor having a pair of windings, of a temperature controlled switch for controlling the circuit through the motor, a solenoid in circuit with one of said windings, an inductive resistance, a mercury tube switch in circuit with each of said windings and operable by the solenoid when the initial impulse current is drawn by the motor, said solenoid being adapted to close said mercury tube switches whereby one of said windings is energized and said solenoid is short circuited through said inductive resistance to delay the return of said switches to initial position, substantially as set forth.

6. The combination of a source of power, a motor having starting and running windings, a pair of switches, an operating coil for said switches, means for establishing a circuit from the source of power through said windings so that the switches are operated to connect the starting winding and the source of power, and to short circuit said operating coil whereby the motor starting circuit and said short circuit are afforded a retarded interruption, substantially as set forth.

In witness whereof, we have hereunto set our hands at Waynesboro, Pennsylvania, this 30th day of April, A. D. nineteen hundred and twenty-six.

FRANK R. ZUMBRO.
FRANCIS SHENTON.